June 10, 1952   S. KRONHAUS ET AL   2,600,005
ADJUSTABLE VEHICLE SEAT
Filed Dec. 31, 1948
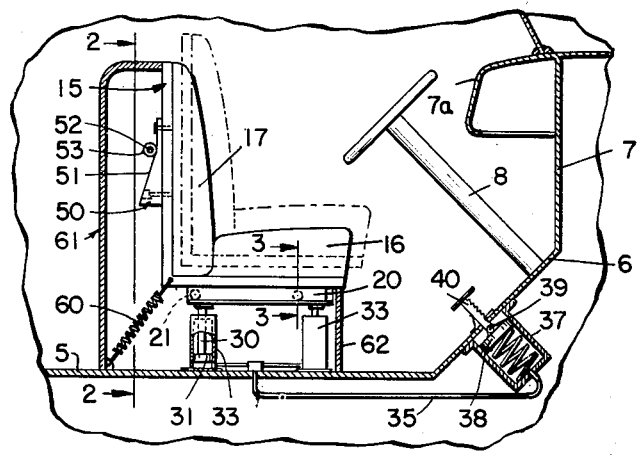
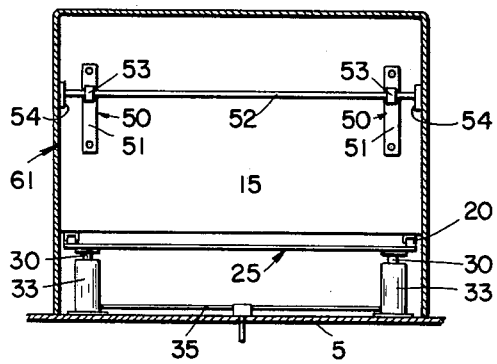
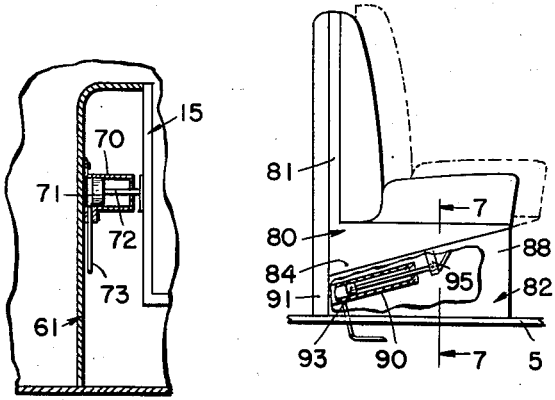
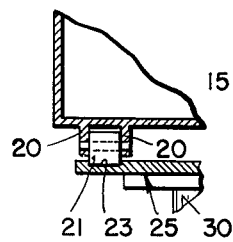
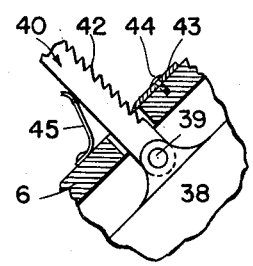
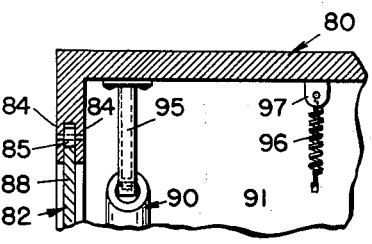
INVENTORS
SEMEN KRONHAUS
LEOPOLD ZOLLMAN
BY
ATTORNEYS Patented June 10, 1952

2,600,005

UNITED STATES PATENT OFFICE 2,600,005

ADJUSTABLE VEHICLE SEAT

Semen Kronhaus and Leopold Zollman,
Los Angeles, Calif.

Application December 31, 1948, Serial No. 68,619

7 Claims. (Cl. 155—14)

This invention has to do with adjustable vehicle seats and has an as an object the provision of a vehicle seat which may be adjusted vertically or horizontally at the will of the operator.

Another object is the provision of a device of this character utilizing fluid pressure means for accomplishing the adjustment.

Another object is the provision of a device of this character in which the seat may be adjusted by the simple operation of moving a foot pedal.

Another object is the provision of a seat arrangement which is not only adjustable but which also absorbs road shocks, preventing them from being transmitted to the seat.

Other objects will appear hereinafter.

To render our invention clearly understandable, we shall now describe preferred embodiments, for which purpose we shall refer to the accompanying drawings, wherein:

Fig. 1 is a view partly in side elevation and partly in section;

Fig. 2 is a view taken on line 2—2 of Fig. 1;

Fig. 3 is an enlarged detail taken on line 3—3 of Fig. 1;

Fig. 4 is an enlarged detail of the foot pedal ratchet arrangement;

Fig. 5 is a sectional fragmentary view showing a modification;

Fig. 6 is an end elevation, with part broken away, showing another modification; and Fig. 7 is an enlarged section taken on line 7—7 of Fig. 6.

It will be understood, of course, that it is not intended that the invention shall be confined to the specific details and arrangement illustrated and now to be described, since further modification is possible within the broader purview of the invention.

Referring now to the drawings, we show at 5 the floorboard of a vehicle, such as an automobile. The footboard is 6, and 7 is the firewall, having an extension 7a providing a dash for the mounting of the usual instruments. The conventional steering post is shown at 8.

At 15 we show an L-shaped seat frame supporting a seat 16 having a back rest 17. The seat frame has, along each end, a pair of spaced parallel depending ribs 20 mounting rollers 21. The rollers engage in transverse tracks 23 provided by recessing the elevator floor 25.

The elevator floor is supported upon piston rods 30 of pistons 31, the respective pistons being mounted to reciprocate in the respective hydraulic cylinders 33. The cylinders communicate, through conduit line 35, with a master cylinder 37 secured beneath the footboard 6 of the vehicle. A piston 38 reciprocates in the master cylinder and has a pivotal connection 39 with a foot pedal 40 extending through the footboard.

The foot pedal is provided with ratchet teeth 42 engaged by a resilient pawl or leaf 43 suitably secured to the footboard as by screw means 44, and a spring 45, likewise secured to the footboard, bears against and urges the foot pedal to the right so that the teeth engage the pawl 43.

Thus, it will be observed that when the operator pushes downwardly on the foot pedal, the hydraulic fluid in the master cylinder is forced into the cylinders 33 beneath the pistons 31, thus forcing the latter pistons outwardly of the cylinders to raise the elevator floor 25. The pawl 43 engages the teeth 42 to retain the piston 38 in its downward fluid displacing position in the master cylinder until it is released by the operator. This release is accomplished by the operator swinging the foot pedal to the left against spring 45 to free the teeth from engagement with the pawl. This latter operation of course lowers the elevator. It will be observed from the foregoing that the piston and cylinder arrangement 31, 33, also act as shock absorbers, rendering the seat more comfortable.

In the form of the invention shown in Figs. 1 and 2, we secure to the rear of the vehicle portion of the seat frame a pair of blocks 50, each having an outer cam surface 51; and we rotatably mount on a shaft 52 a pair of rollers 53 which engage the cam surface. The shaft is secured at its ends to the seat frame, as by brackets 54.

A coil spring 60 is secured at its bottom end to the intersecting portions of the floorboard 5 and the seat housing 61, which housing is completed by means of an upright front wall 62. The upper end of the spring 60 is secured to the corner portion of the seat frame, so that the spring is disposed to exert a diagonal downward and rearward pull on the seat frame. Thus, as the elevator lifts the seat frame, the seat frame is cammed forward a distance commensurate with the extent of elevation, by means of the cam surfaces 51 and rollers 53. For instance, during this movement the seat moves from the full line to the broken line position of Fig. 1. The seat is maintained in that position by the elevator and the cam arrangement. However, as fluid is released from the cylinders 33 to return to the master cylinder, the elevator lowers and the spring 60 draws the frame rearwardly and downwardly as the cam rollers 53 roll upwardly along the tapered cam surfaces 51.

It will be understood, of course, that in the broader aspects of the invention we contemplate that the cylinders and pistons 33, 31 may be either pneumatically or hydraulically operated, or that instead of the fluid being forced from the master cylinder to the cylinders 33, any valve controlled source of fluid under pressure may be employed, such, for instance, as compressed air.

In Fig. 5 we show a modification in which the seat may be elevated without being automatically cammed forward in response to vertical movement of the seat, or the seat may be pushed forward without being elevated or lowered. We accomplish this by substituting for the cam arrangement described, an independent cylinder 70, carrying a piston 71 having a piston rod 72 bearing at its outer end against the seat frame, the cylinder having fluid communication with a source of fluid under pressure, such as the master cylinder, as by a line 73. One or more of the cylinder 70 and pistons 71 may be employed as may be desired.

In Figs. 6 and 7 we show a further modification wherein the seat frame, generally designated 80, consists of a movable, somewhat L-shaped upper portion 81 and an open topped box-like bottom portion 82, the latter being fixed to the floor 5.

The upper portion has at each end a pair of spaced parallel depending ribs 84, each pair defining a channel therebetween in which rollers 85 are mounted in a row declining towards the rear of the seat frame. The bottom portion 82 has upright end walls 88 extending into the respective channels to be engaged at their top edges between rollers. The top edges of walls 88 define tracks for the rollers, which tracks decline towards the rear of the seat frame. Thus, as the upper portion 81 is moved forward the seat is elevated.

To move the seat frame forward we provide a pair of parallel cylinders 90 anchored to the stationary back wall 91 of the bottom portion. Each of the cylinders carries a piston 93 which engages at its outer end a depending bracket 95 carried by the upper side frame portion. A fluid line leads from the cylinder, behind the piston therein, to a master cylinder such as shown in Fig. 1. To return the seat frame to the position of Fig. 6 from the broken line position of that figure, we may use a coil spring 96 anchored at one end to a bracket 97 depending from the medial part of the upper portion 81, or anchored at its other end to the wall 91.

We claim:

1. An adjustable vehicle seat device comprising a seat frame, elevator means for raising the frame and means operable in response to vertical movement of the frame to move the frame horizontally.

2. An adjustable vehicle seat device comprising a seat frame, a seat elevator having rolling engagement with the seat frame, and means operable to move the seat frame horizontally on the elevator, the latter means comprising a cam member operable in response to vertical movement of the seat frame.

3. An adjustable vehicle seat device adapted to be supported from the vehicle floor, comprising a seat frame, an elevator floor providing parallel transverse tracks, roller means carried by the seat frame for rolling engagement with the tracks, fluid actuated jack means vertically adjustably supporting the elevator floor, means operable to supply fluid under pressure and release it from the jack means, and means operable in response to vertical adjustment of the elevator floor to move the seat frame horizontally relative to the elevator floor.

4. An adjustable vehicle seat device adapted to be supported from the vehicle floor, comprising a seat frame, an elevator floor providing parallel transverse tracks, roller means carried by the seat frame for rolling engagement with the tracks, fluid actuated jack means vertically adjustably supporting the elevator floor, means operable to supply fluid under pressure and release it from the jack means, and cam and follower means operable in response to vertical adjustment of the elevator floor to move the seat frame horizontally relative to the elevator floor.

5. An adjustable vehicle seat device adapted to be supported from the vehicle floor, comprising a seat frame, an elevator floor providing parallel transverse tracks, roller means carried by the seat frame for rolling engagement with the tracks, fluid actuated jack means vertically adjustably supporting the elevator floor, means operable to supply fluid under pressure and release it from the jack means, cam and follower means operable in response to vertical adjustment of the elevator floor to move the seat frame horizontally in one direction relative to the elevator floor, and spring means operable to move the seat frame horizontally in the opposite direction relative to the elevator floor.

6. In a vehicle seat adjusting device, an elevator, a seat frame supported by and movable with the elevator into elevated position, said seat frame being laterally movable relative to the elevator, and means operable in response to movement of the seat frame into elevated position to move the seat frame laterally relative to the elevator.

7. In a vehicle seat adjusting device, an elevator, a floor supported by and movable with the elevator into elevated position, a seat frame laterally movably supported on the floor, and means operable in response to vertical movement of the seat frame to move the seat frame laterally relative to the floor.

SEMEN KRONHAUS.
LEOPOLD ZOLLMAN.

REFERENCES CITED

The following references are of record in the file of this patent:

UNITED STATES PATENTS

| Number | Name | Date |
|---|---|---|
| 1,187,745 | Kerr | June 20, 1916 |
| 1,446,833 | Carlson | Feb. 27, 1923 |
| 1,677,584 | Cronwall | July 17, 1928 |
| 1,957,785 | Knapp | May 8, 1934 |
| 2,088,784 | Galamb et al. | Aug. 3, 1937 |
| 2,270,233 | Shaw | Jan. 20, 1942 |
| 2,432,895 | Horton | Dec. 16, 1947 |

FOREIGN PATENTS

| Number | Country | Date |
|---|---|---|
| 14,029 | Great Britain | of 1914 |